June 8, 1965 E. C. WHIPPLE, JR 3,188,472
METHOD AND APPARATUS FOR DETERMINING SATELLITE
ORIENTATION UTILIZING SPATIAL ENERGY SOURCES
Filed July 12, 1961 5 Sheets-Sheet 1

INVENTOR
ELDEN C. WHIPPLE JR.
BY
ATTORNEYS

INVENTOR
ELDEN C. WHIPPLE JR.

June 8, 1965 E. C. WHIPPLE, JR 3,188,472
METHOD AND APPARATUS FOR DETERMINING SATELLITE
ORIENTATION UTILIZING SPATIAL ENERGY SOURCES
Filed July 12, 1961 5 Sheets-Sheet 4

INVENTOR
ELDEN C. WHIPPLE JR.
BY
ATTORNEYS

FIG. 13

3,188,472
METHOD AND APPARATUS FOR DETERMINING SATELLITE ORIENTATION UTILIZING SPATIAL ENERGY SOURCES
Elden C. Whipple, Jr., Washington, D.C., assignor to the United States of America as represented by the Administrator of the National Aeronautics and Space Administration
Filed July 12, 1961, Ser. No. 123,597
18 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

The present invention relates to an orientation sensing method and device and more particularly to an improved method and apparatus for the determination of the orientation of a space vehicle or satellite.

Recent advances in the field of space technology have provided means for the control of a space vehicle within comparatively precise limits. In order to more fully utilize such control systems it is necessary that the exact aspect orientation of a space vehicle be known. It will be appreciated that for a satellite vehicle in orbit about the earth it is usually impossible to rely upon visual observation to determine the orientation angle of the object under consideration. Rather, more sophisticated devices must be utilized to make measurements with respect to the local environment of the vehicle and then transmit information resulting therefrom to receiving and tracking stations on the earth.

The prior art has seen the development of a number of systems, or proposed systems, which measure and record various diverse phenomena present in space for this purpose. Such systems are usually based on solar aspect sensors which measure the angle of incidence of sunlight as seen from the satellite vehicle thereby enabling one to determine the angular orientation of such a vehicle within a plane. More refined systems of this nature will uniquely define the orientation angle. Further consideration of the problem will make evident the fact that a satellite in an orbit about the earth will for considerable intervals of time be in the shadow of the earth so that the sun will not be visible to sensors placed on the satellite surface. This condition is aggravated when the vehicle is placed in a comparatively small orbit that is approximately circular in nature. Under such conditions, and more especially when the satellite is in close proximity to the earth, a major portion of the satellite's track may be in the shadow of the earth. When this occurs it will be realized that the more conventional solar aspect sensor will be of no value.

Therefore, it is extremely desirable that a system be provided whereby the determination of vehicle orientation is not dependent on the sun or any other phenomena which may be obscured during certain portions of the vehicle's orbital track.

In addition, it is desirable that certain other quantities be measurable such as, for example, the spin rate of the vehicle or the magnitude of various diverse fields and particles that may exist in the immediate vicinity of the satellite. When such measurements may be used to effectuate a determination of the satellite aspect angle, additional data may be derived therefrom which will be of general scientific value yet which may be obtained without the allocation of additional telemetering channels.

The instant invention contemplates a solution to the problem of determining the orientation of a satellite traversing a known orbit and at a known position therein which will be equally effective when the satellite is within the shadow of the earth as when it is exposed to solar radiation. It is further proposed to utilize a method for determining orientation which will include as a useful by-product a determination of physical conditions adjacent the satellite body.

Briefly stated, the present invention includes a plurality of particle traps of relatively simple construction, sensitive to the impingement of either charged particles or light radiation, which are positioned about the satellite's surface. As used herein the term particle trap comprehends a trap excited by either charged particles such as electrons or ions and also photons of light radiation. Such traps are utilized to detect the ion concentration in the vicinity of the vehicle, the local magnetic field as a product of its effect on the trajectory of free electrons and the measurement of a photo-emission current generated by the action of the sun or a similar radiating body. The invention provides as one of its features a method for completely determining the satellite orientation angle utilizing measurements from only two of the three types of energy traps included. Thus, it is possible to ascertain this angle of the vehicle at such times as the earth or a similar object is interposed between the sensor and a luminous body with which it would normally be desired to determine the orientation relative thereto.

As will be pointed out more clearly hereinafter, the traps constitute a simple structure comprising a plate and two grids which are capable of relatively substantial construction and are unaffected by reasonable shocks and acceleration forces. The detailed particulars of the invention will be more easily appreciated as the description proceeds in development in the remaining portions of this specification.

Accordingly, one object of the present invention is to provide an improved method for determining the orientation of a body in space.

Another object is to provide a method of determining the orientation of a space vehicle independent of the visibility of the sun.

Yet another object is to provide a method of determining the spin rate of an artificial satellite.

A further object is to provide a method of measuring the direction of the magnetic field adjacent a moving object.

A still further object is to provide improved apparatus for determining the angular orientation of a satellite type of vehicle.

It is also an object to provide means for determining the orientation angle of a space vehicle utilizing ion and electron traps mounted on the surface of said vehicle.

A further object is to provide an orientation determining device for space vehicles capable of providing sufficient information to determine the aspect angles in spatial coordinates of a satellite following a known orbit.

Various other objects and advantages will appear from the following description of several embodiments of the invention and the novel features will be particularly pointed out hereinafter in connection with the appended claims.

Figure 1:
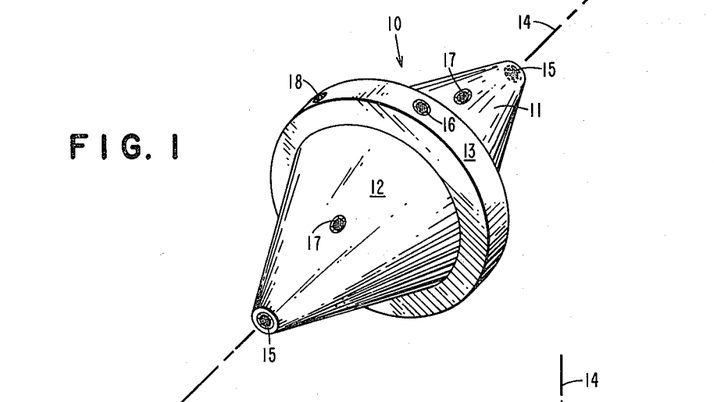
Referring to FIG. 1, there is illustrated one typical application of the invention with ion and electron traps suitably positioned on the outer surface of a satellite.

Referring now to FIG. 1, there is illustrated a typical satellite type of vehicle 10 suitable for the practice of the instant invention. The illustrated satellite 10 includes an upper conical member 11, a lower conical member 12 and a central equatorial section 13. The satellite is designed to rotate about an axis 14 when placed into a desired orbit. To practice the invention, a plurality of particle sensitive traps are placed about the surface of the vehicle in suitable positions as will be more fully described. As will also be developed hereinafter, three different types of traps are available and suitable for operation of the instant invention. At any given time, however, and as will be explained with particular reference to FIGS. 9 and 10, it is only required that two of the three disclosed trap types be utilized at any given time to completely ascertain the angular orientation of the vehicle.

A plurality of either one of the two types of traps selected are linearly spaced on the vehicle surface to extend from one pole to the other. In the illustrative embodiment, a trap 15 is placed at each of the poles of the satellite, a third trap 16 is placed at the equator and two more 17 are linearly disposed intermediate the poles and the equator such that all five traps lie in a plane passing through axis 14. A single trap 18, of the second type selected, is preferably, although not necessarily, positioned about the equator and separated from the plane of the traps 15, 16 and 17 by a predetermined angle.

Figure 2:
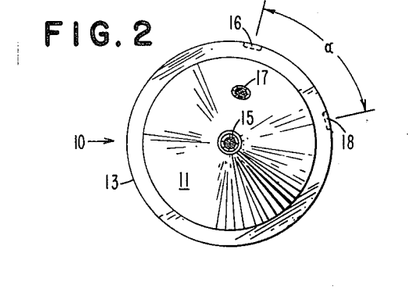
In FIG. 2, there is illustrated a top view of the satellite of FIG. 1 particularly showing the angular spacing between the electron and the ion traps.
Figure 3:
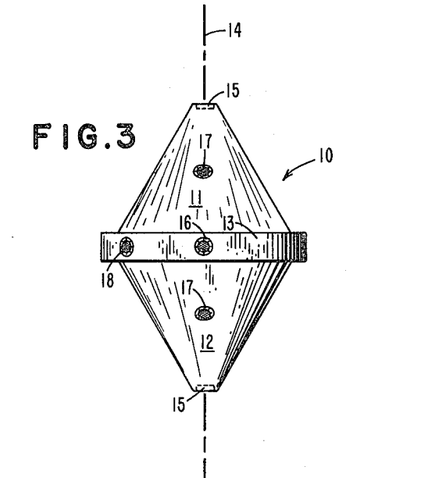
FIG. 3 is a side view of the satellite of FIG. 1, again illustrating the arrangement of the various traps.

FIGS. 2 and 3 more clearly illustrate the positioning of the aforementioned traps. In FIG. 2 it will be noted that, when looking down on the top of the vehicle, the traps 15, 16 and 17 extend linearly along the side of the vehicle while the trap 18 is displaced about the equator by a predetermined angle α. Referring to FIG. 3, a side view of the satellite, it will be immediately appreciated that the traps 15, 16 and 17 extending from pole to pole are disposed in a plane containing the satellite axis 14.

Before proceeding further with a discussion of the present invention, it is desirable that the information required to determine the orientation angle of a satellite vehicle be considered. When a satellite is placed into an orbit, conventional methods may be utilized at any given time to determine with relatively precise accuracy the orbital path and the position of the body along such path. Then, in order to uniquely determine the aspect angles it is sufficient to ascertain the direction relative to the satellite surface of a vector having a known direction in space and to determine the location relative to the satellite of a plane which contains a second vector, also having a known direction in space. When the location of the vehicle is known and the vector direction of diverse physical quantities are known at that locality, the determination of the relative orientation between that vehicle and such physical quantities will suffice to determine the orientation angle of the satellite in space. It must be realized that for purposes of this embodiment it is not sufficient to measure the direction of a single vector. For example, if a vector is determined relative to the surface of a satellite, the vehicle may be rotated about an axis coincident with such a vector without affecting the signal generated at such a point. Therefore, as pointed out, in order to uniquely determine the orientation angle it is necessary to also determine, relative to the satellite, the plane in which a second vector lies, the exact location of such a vector within the determined plane not being required. In general, the present invention will for purposes of determining the orientation of a satellite, utilize the information obtained by measuring the angle of incidence of a first physical vector relative to the surface of the satellite and a plane containing a second physical vector, which plane is located relative to a known point on the satellite's surface. This information will then be utilized to uniquely determine, in the coordinates of celestial space, the orientation angle of the vehicle carrying the measuring devices.

As was mentioned above, three types of traps are suitable for the practice of the instant invention and, in practice, may all be simultaneously carried by a satellite vehicle so that the desired information is selected from the two most reliable types at any given moment. As will be described in more detail hereinafter, measurements are made which are indicative of the velocity vector, the solar vector and the magnetic field intensity vector according to the particular trap utilized. In some instances such as, for example, when the satellite is in the shadow of the earth, it will prove impractical to use one of the traps which therefore dictates the utilization of the remaining pair. The inclusion of all three provides a desirable flexibility in the orientation determination process which will provide additional reliability of operation and considerable superiority over prior art systems which are dependent on ascertaining the direction of the solar vector.

Figures 4, 5:
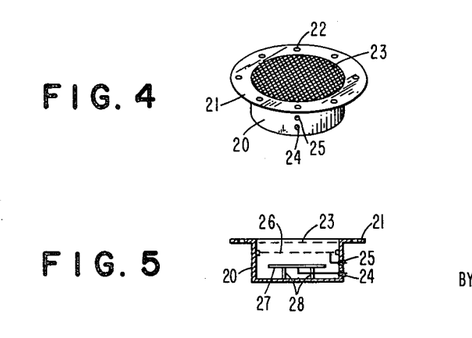
FIG. 4 is a perspective view of a typical trap utilized in the practice of the instant invention.
FIG. 5 is a cutaway view of the trap illustrated in FIG. 4 showing the mechanical construction thereof.

The actual traps which are utilized to effectuate the desired measurements are mechanically identical, although electrically connected in a different manner to accomplish different measurements. Referring to FIGS. 4 and 5, the construction of the traps will be more completely understood. FIG. 4 is a perspective view of a typical trap which consists of a flat cup shaped member 20 provided with a flange 21 including mounting holes 22 to facilitate attaching the trap configuration to the satellite surface. The exterior appearance of a trap when exposed through the satellite skin is that of a simple wire mesh grid 23. In the side of cup member 20, which extends into the interior of the satellite when properly mounted, are provided two electrical feedthrough connectors 24 and 25 which permit circuit wires to extend through the cup member 20.

A cutaway illustration is shown in FIG. 5 which reveals two grids, an outer grid 23 which is attached to the edge of flange 21 and electrically grounded, and an inner grid 26 which is electrically insulated from the cup member 20. Beneath the two grids is positioned an electrical plate 27 which is mounted on insulated supports 28. An electrical connection is made between inner grid 26 and feedthrough connector 25 while a second connection is made between plate 27 and feedthrough connector 24.

Figure 6:
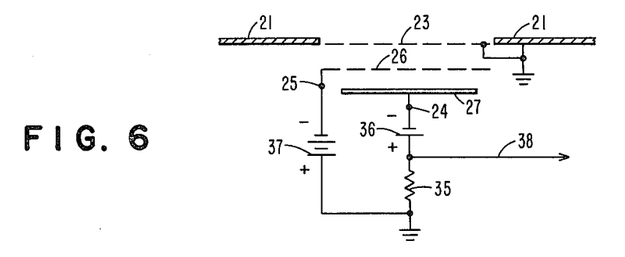
FIG. 6 is a schematic representation of a typical circuit utilized in an ion trap incorporated in the instant invention.
Figure 7:
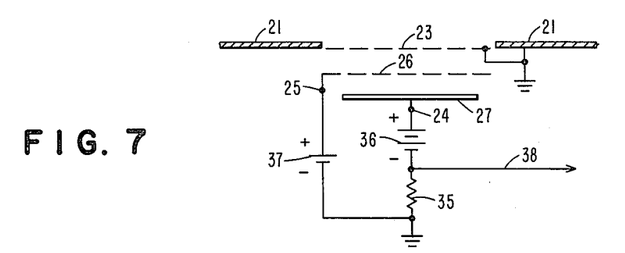
FIG. 7 is a schematic representation of the circuit configuration of an electron trap utilized in the invention.
Figure 8:
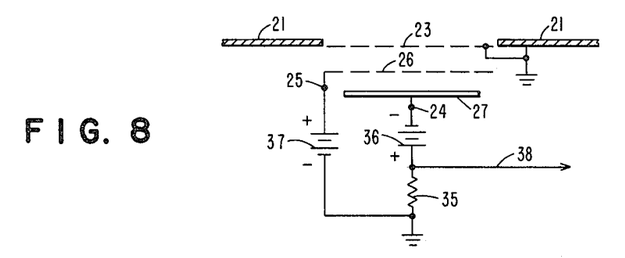
FIG. 8 is a schematic representation of a photo-emission current trap utilized in the present invention.

As mentioned, the physical structure illustrated in FIGS. 4 and 5 is utilized with various electrical connections to effectuate the desired measurements. FIGS. 6, 7, and 8 illustrate, respectively, the connections required to utilize the trap structure for the measurement of ions (related below to velocity vector determination); electrons (which are utilized to measure the magnetic field intensity vector);

and the photo-emission current (solar vector determination. In each application the outer grid 23 is grounded to the flange 21 and hence to the satellite shell. The inner grid of the ion trap (FIG. 6) is connected to the negative pole of suitable voltage means 37, the positive side of which is grounded. The plate 27 is connected to the negative side of suitable voltage means 36, the positive side of which is connected through load resistor 35 to ground. For proper operation of this circuit as an ion trap it is necessary that the voltage means or battery 36 have a lesser magnitude than voltage means 37. Intermediate voltage cell 36 and resistor 35 a connection 38 is made to extract an output voltage from the circuit. Feedthrough connectors 24 and 25 are provided in each circuit.

The electron trap which is utilized to determine the direction of the magnetic field intensity vector is schematically illustrated in FIG. 7 which is similar to that of FIG. 6 except that the polarities of the batteries are reversed and that voltage means 36 has the greater magnitude. The inner grid, being biased positively in contradistinction to the negative bias of the ion trap, serves to remove any incoming ion current from the measured collector current.

In FIG. 8 is found a schematic representation of the photo-emission current trap. It will be noted that this is identical to the two preceding traps with the exception that the collector supply voltage is negative with respect to ground and the grid 26 has a supply voltage positive with respect to ground.

It should be appreciated that for proper circuit operation either resistor 35 must be a low resistance or else a feedback type of output circuit should be used to prevent the voltage drop across the resistor from reversing the polarity of the anode at the time an output signal is generated.

The three above mentioned traps produce output signals in response, respectively, to impinging ions, electrons and light radiation, and generate signals making it possible, in accordance with the principles of the invention, to determine satellite aspect angles and other information essential to space exploration. The traps have been selected to measure the particular physical phenomena mentioned because these phenomena, light radiation, the velocity vector, and the magnetic field intensity vector are susceptible to measurement by comparatively simple means and, further, because their direction is well known in the locations at which it is contemplated that the instant invention will be practiced. Light radiation from a celestial body, which is often utilized as the sole reference frame in the more conventional sensing devices, provides one convenient source of positional information inasmuch as such radiation travels along a relatively straight path and the location of radiating celestial bodies is well known. Thus the determination of the light radiation vector in cellestial coordinates at the position of the satellite in space, which position is assumed to be a known quantity, is relatively simple. The velocity vector is, of course, known from the orbital information relative to the satellite when taken in conjunction with the position of the satellite in its orbit. The magnetic intensity vector has been measured and mapped in space to a distance of several earth diameters. Therefore, the utilization of the various types of particle traps according to principles to be described hereinafter will provide sufficient information to ascertain the aspect orientation of a space vehicle at a known position in a known orbit.

Figure 9:
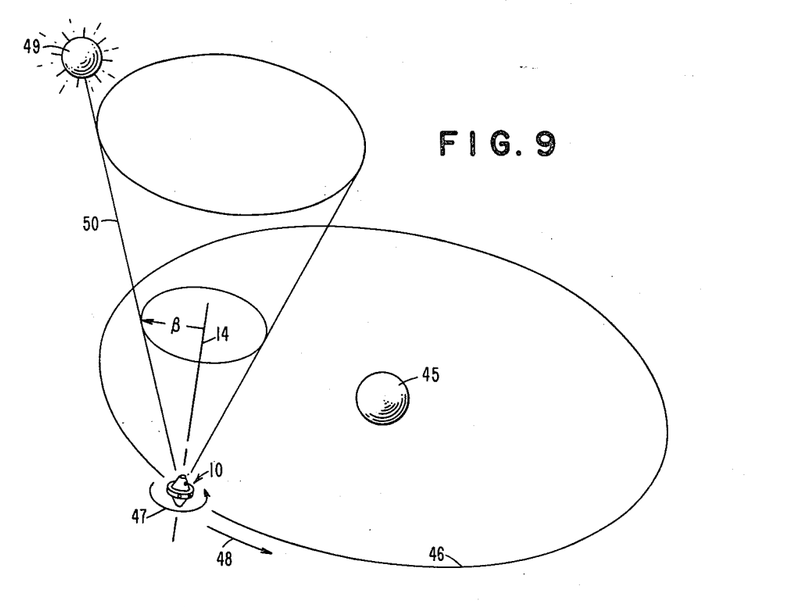
FIG. 9 is a diagrammatic representation of a satellite in an exaggerated orbit about the earth utilizing a plurality of photo-emission current traps and an ion trap to determine the angular orientation.
Figure 10:
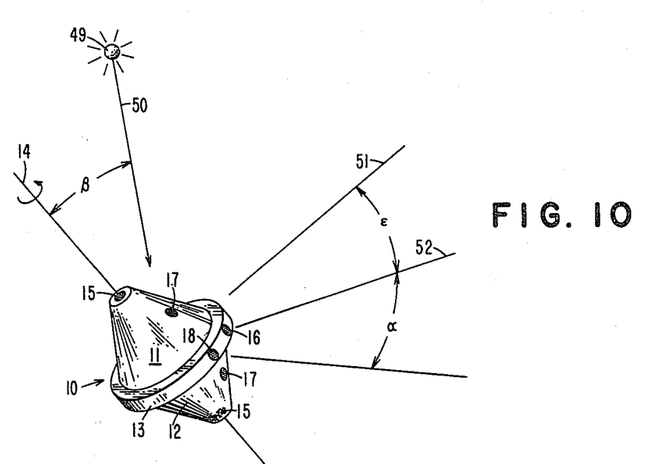
FIG. 10 is a perspective view of the satellite of FIG. 9 illustrating the angular arrangement of the photo-emission current traps.

Referring now to FIGS. 9 and 10, the operation of the instant invention may be more fully understood by considering an example of an orientation angle determination wherein plural photo-emission traps and a single ion trap are utilized.

A satellite 10 is illustrated rotating about its axis 14 in a direction shown by arrow 47 and orbiting about the earth 45. The orbital path 46 of satellite 10 is illustrated in a greatly exaggerated manner for clarity. A luminous body, shown as the sun 49, is illustrated emitting a light ray 50 which strikes the satellite. The satellite 10 is provided with five photo-emission traps 15, 16 and 17 placed around one side of the satellite and extending from pole to pole as was described in conjunction with FIG. 1. These traps are placed so as to lie in a plane passing through the axis 14 of the satellite.

As the traps 15, 16 and 17 mounted on the suface of satellite 10 are rotated about axis 14, as shown, it is evident that at some point in the course of each rotation, light rays impinging on the satellite will always pass within 45° of at least two of these traps. In general the individual output of each trap will fluctuate from zero to some positive value depending on the angular position of the satellite as it rotates about its axis. The two polar traps, of course, will experience no variation with rotation inasmuch as their relative position with respect to an impinging light ray remains constant. The two traps exhibiting the greatest maximum response level during a complete revolution are utilized to determine the angle of the impinging light ray relative to the satellite axis.

For example, assume that, as shown in FIG. 9, light ray 50 emanating from the sun 49 impinges on satellite 10, and further assume that the angle between the light ray 50 and the axis of satellite rotation 14 is the angle $\beta$ in FIG. 9. The angle $\beta$ and the satellite are depicted in an enlarged view in FIG. 10 where it will be observed that the two uppermost traps will exhibit the maximum output as a result of this radiation. Realizing that the output of the uppermost trap on the polar axis will not vary with satellite rotation and further assuming a maximum current $I_0$, when the sun is directly over a trap, the output of the upper polar trap, $I_1$, may be represented by $I_0 \cos \beta$. It should be noted that, while for practical purposes the photo-emission output can be represented as a cosine function, it is not an exact representation inasmuch as the shadow effect at angles removed from the zenith will cause some deterioration of the predicted signal.

For the second trap down from the top, 17, the output will be dependent on two possible variations. The first is dependent on $\beta$ and will be an approximate function of the cos of $45° - \beta$. This may be more clearly appreciated by considering a numerical example. Since the trap 17 is disposed at an angle of 45° to the satellite axis 14, if $\beta$ is assumed to be an angle of 30°, the angle between light ray 50 and the upper trap 17 is clearly 15° and $I_2$ will be $I_0 \cos (45-30)$, or $I_0 \cos 15°$. However, this expression for $I_2$ must be further modified to reflect the angular rotation of the satellite since the above expression tacitly assumes that trap 17 has been rotated about the satellite axis so that it is in a plane formed by the axis 14 and light ray 50 thus giving a maximized output. For a rotating satellite this condition is existent only once during each rotation. Therefore, the expression for $I_2$ must be further modified by including a factor to reflect the variation produced by satellite rotation.

As is shown in FIG. 10, a line 51 is projected in the plane which includes the satellite axis 14 and light ray 50. At the particular point in the satellite's rotation illustrated, the line 52 is projected in the plane of the satellite axis 14 and the sensors 15, 16 and 17. These two planes are separated in space by an angle which varies from 0° to 180°, as the satellite rotates, and which is designated as the angle $\epsilon$. It should be noted that the output of trap 17 will also vary approximately as the cos $\epsilon$ through that portion of its rotation where the cosine has a positive value. Of course, cos $\epsilon$ will vary from one to zero as $\epsilon$ varies from 0° to 90°. When $\epsilon$ has a value between 90 and 180°, cos $\epsilon$ will have a negative value. It will be appreciated from the physical conditions present that when $\epsilon$ is greater than 90° the output of trap 17 will be zero unless the radiation source is approximately over the axis of rotation under which condition the output may have a detectable magnitude throughout the satellite's entire rotation. Unless, however, the source is located directly over an axis of satellite rotation a clear maximum signal is obtained when $\epsilon$ is zero. Therefore, the output of trap 17 may be expressed by the mathematical relationship $I_2 = I_0 \cos(45-\beta) \cos \epsilon$.

The expression for the ratio between $I_1$ and $I_2$ at the time $I_2$ peaks, since $\cos \epsilon$ is unity, is $$\frac{I_1}{I_2} = \frac{\cos \beta}{\cos(45-\beta)}$$

and from this expression the tangent of $\beta$ may be developed as $$\tan \beta = \frac{1}{\sqrt{2}}\left(\frac{I_2}{I_1}\right) - 1$$

Thus, given the ratio of $I_1$ and $I_2$ the angle between the incident light radiation and the satellite axis may be determined. Since the position of the satellite in its orbit is already known and the location of the light source is known, the determination of the angle by which light ray 50 impinges on the satellite surface will partially determine the orientation angle of such a satellite.

By the above operation a line has been determined from the center of the satelilte to the light source, which line passes through a determined point on the satellite surface. Such information will enable a monitoring station to ascertain that at a particular time a particular point on the surface of the satellite is oriented in the direction of a known radiating body. This information, however, is not sufficient to uniquely determine the satellite orientation, inasmuch as the vehicle may be rotated about the determined line without affecting the output signal. Therefore, as was mentioned previously, it is necessary to position one other point on the satellite within a known plane to uniquely define the orientation angle thereof.

The present invention contemplates the utilization of one of the two remaining types of traps to obtain such additional information. In the present illustrative example it has been assumed that the second type of trap selected is an ion sensitive device 18 which is illustrated in FIG. 10 as being positioned on the satellite equator. As will be recalled from FIG. 2, the second trap 16 is displaced around the satellite equator by a known angle, $\alpha$, from the plane in which the first mentioned traps are placed.

It has been determined that the random motion of such ions as are present in the rarefied upper atmosphere is at velocities which are relatively small when compared with the velocity of the usual satellite. The ion trap, when rotated to the forward direction, that is in the direction of the velocity vector, will exhibit an increased output inasmuch as the velocity of the satellite tends to cause the ion trap to "scoop up" ions as it moves through space. Conversely, in the opposite or reverse direction, the ion trap will exhibit an approximately zero output since its motion is away from the local ion concentration and at a velocity which exceeds that of their random motion. Therefore, it will be realized that as the satellite rotates about its axis 14 the ion trap 16 will exhibit a varying output which reaches a maximum when the trap is pointed in the direction of the velocity vector. At this time the velocity vector has been established within a plane including the ion trap and the satellite axis.

This information will serve several useful purposes. First, the pulse which occurs once during each satelilte rotation indicates the spin rate of the vehicle. Secondly, knowing the time at which this pulse is transmitted and the spin rate, which normally is constant, the angular position of the ion sensor relative to the velocity vector, which is tangent to the orbit, may be calculated for any time.

Of particular importance to the present discussion, however, is the combination of the information derived from the ion trap with that information from the photo-emissivity traps so as to uniquely determine the orientation in space of the satellite vehicle. In the present embodiment the angle of incidence of a light ray has been measured relative to the satellite or in the satellite coordinate system. By the term satellite coordinate system reference is made to an arbitrary system which may be assigned to the satellite and which is independent of a normal celestial coordinate system. For example, a system may be defined having a Z axis parallel to the satellite spin axis, an X axis perpendicular thereto and including the velocity vector in the X–Z plane, and a Y axis mutually perpendicular to the defined X and Z axes. From the definition given above, it will be realized that the ion sensor, which peaks when oriented in the plane containing the velocity vector, will peak as it passes through the X—Z plane. By noting the relative times at which the photo-emissivity sensors peak and the ion sensor peaks, and by knowing their angular displacement about the surface of the satellite (the angle $\alpha$ shown in FIG. 2), the angular position of the plane containing the satellite axis and the photo-emissivity sensors may be established in the defined satellite coordinate system. As was explained above, the angle $\beta$, which is the angle of inclination of the incident light ray with respect to the satellite axis, may be determined and is the angle of that light ray relative to the Z axis in the satellite coordinate system. Thus sufficient information is available to ascertain the orientation of the satellite within the defined satellite coordinate system. The coordinates of the light ray and the satelilte velocity vector, as stated previously, are both known in celestial coordinates and will provide sufficient information to develop a transformation matrix by which the satellite coordinate system may be transformed into the celestial coordinate system. Thus the orientation of the satellite in celestial coordinates may be uniquely determined.

It should be realized that in the aforedescribed embodiment a plurality of photo-emission traps has been described in conjunction with a single ion trap. However, it should be understood that this ratio might be reversed by utilizing a plurality of ion traps which would, in a similar manner, determine the velocity vector uniquely. A single photo-emissivity trap might in that instance be utiilzed to ascertain the position of the solar vector within a plane.

As was previously stated it is of importance that an orientation system be developed which is not dependent on the visibility of any celestial body such as the sun. Thus, as will be demonstrated hereinafter, an additional trap is utilized which may be substituted for either of the two types of traps which were incorporated in the preceeding described embodiment.

In normal practice it will often be desirable to incorporate in the satellite configuration all three particle traps described in conjunction with this invention, making use of only two types at any given time, so that a continuous flow of information relative to the satellite orientation is received at various ground stations. In this manner, by providing means for selecting the outputs of the two most productive type traps, a comparatively accurate representations of the satellite's orientation may be produced at all times regardless of the position of the satellite or any latent ambiguities that may be present in any single type trap output.

Figure 11:
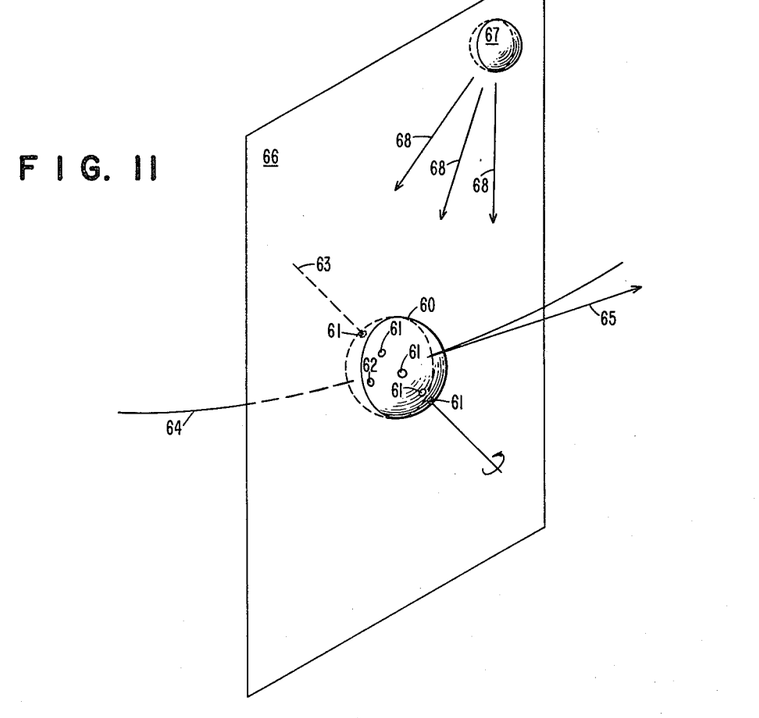
FIG. 11 is a diagrammatic representation of a satellite vehicle in a plane with the sun, illustrating how a plurality of ion traps and a single photo-emission current trap may be utilized to determine vehicle angular orientation.
Figure 12:
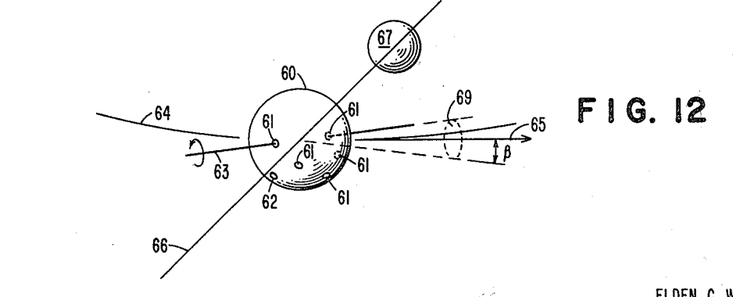
FIG. 12 is a plan view of the diagrammatic configuration of FIG. 11, illustrating the relationship between the sun, a satellite vehicle and the satellite orbit.

Referring now to FIGS. 11 and 12, an embodiment of the instant invention is illustrated utilizing a plurality of ion traps 61 and a single photo-emissivity trap 62. Before proceeding with the discussion it should be realized that the position in celestial coordinates of the satellite, its direction of motion and the location relative thereto of such luminous bodies as may be utilized as sources of light radiation are all known. For the particular application to be herein described it is not desired that these quantities be located but that, rather, the spin axis and the orientation of the satellite vehicle thereabout be determined with respect to these already known physical quantities. In FIG. 11 there is contained within a plane 66 both a satellite 60 and the sun 67. The satellite 60 is traversing orbit 64 in the direction shown by velocity vector 65, which at any given instant is tangential to the satellite orbit. FIG. 11 may be more completely understood by simultaneous reference to FIG. 12 which is a view looking down on the top of plane 66 and illustrates the relationship of the sun 67, the satellite 60, its orbit and the satellite axis 63 with respect to plane 66. The satellite rotates about axis 63, which is illustrated as passing through but not coincident with plane 66. It must be realized that the actual orientation of this spin axis is an unknown and is one of the desired solutions. Five ion traps 61 are positioned about the surface of satellite 60 in a plane passing through its axis in a manner similar to the manner of positioning the photo-emission traps described in the previous embodiment. Also, in like manner as previously described, the outputs of the two ion traps having the greatest magnitude will be selected to determine the angle of velocity vector relative to the satelite spin axis. It may be noted from FIGS. 11 and 12 that, due to the physical geometry of the structural configuration, the angular relationship of the photo-emission trap 62, which is preferably located on the satellite equator, to the plane containing the ion traps 61 is a known quantity. A further inspection of FIG. 12 will make evident that, since the velocity vector 65 has a known position in space, and since the angle of that vector in the plane containing the satellite axis and the ion traps 61 is also known at a given time, the satellite spin axis must be somewhere on the surface of cone 69 which has a half-angle of $\beta$. Now, imagine the satellite to be rotated about an axis formed by the velocity vector 65 so that photo-emission sensor 62 will lie in the plane 66. This is the position corresponding to the maximum output of sensor 62 which occurs at the time the trap is in a position in plane 66 most nearly facing the sun 67 and will fix a position of the spin axis on the surface of cone 69. It is now obvious that, by correcting for the angular separation between the ion traps and the photo-emission trap, and the angle between the velocity vector and the plane 66, the actual position of the axis 63 as shown in FIGS. 11 and 12 may be obtained. Thus it will be appreciated that, in a manner similar to that described in conjunction with FIGS. 9 and 10, the satellite's orientation in space may be ascertained by determining the direction relative to the satellite of the velocity vector, and a plane containing a second known vector, the solar vector.

Prior to describing the operation of the third type of trap incorporated in the instant invention, which is utilized to measure the direction of the magnetic intensity vector at the location of the satellite, it should be realized that the direction of the magnetic intensity vector is known for any position in space out to several earth diameters. Thus by knowing the position of the satellite in its orbit, the location of that orbit, and the direction of the magnetic intensity vector at such a position in space, it is possible to utilize this information to aid in determining the satellite orientation. The instant invention includes such a measurement which provides for the described flexibility and independence from any requirement that a luminous body be visible in order to effectuate a determination of the vehicle orientation.

Figure 13:
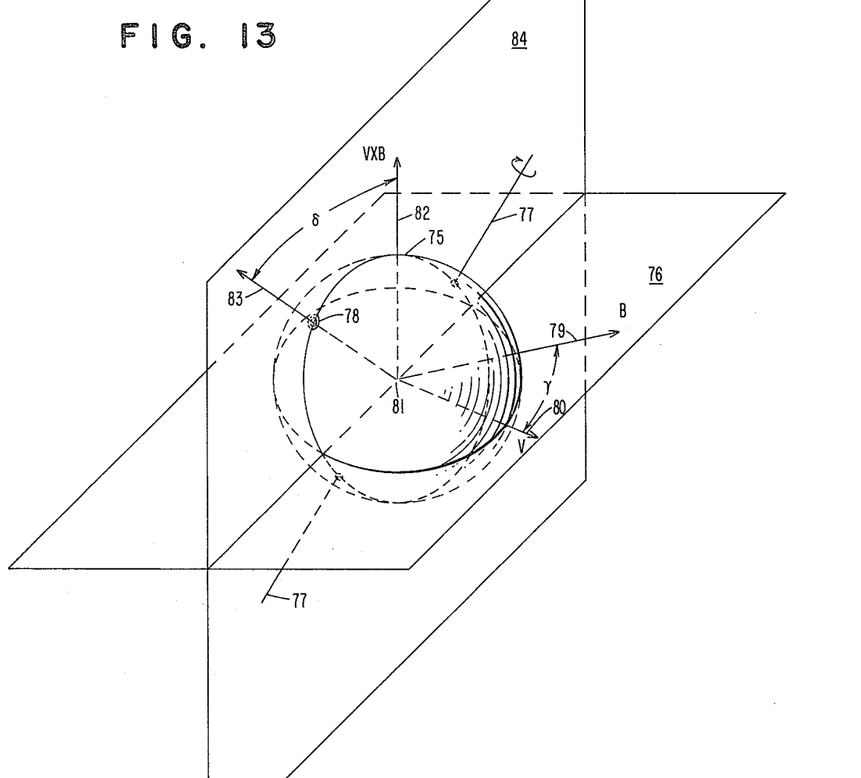
FIG. 13 is a diagrammatic representation of a satellite vehicle including an electron trap, illustrating the method by which the direction of the magnetic intensity vector is determined.

Referring now to FIG. 13, there is illustrated how one embodiment of the method of the invention can be utilized to measure the direction of the magnetic intensity vector relative to the satellite vehicle. For simplicity of illustration only a single electron trap is utilized. However, it should be understood that a plurality of these traps could be utilized in a manner similar to that previously described to completely ascertain the direction of the magnetic intensity vector. Alternatively, a single trap may be positioned on the satellite surface as shown to determine a plane containing this vector. A spherical satellite 75 is illustrated with plane 76 passing through the satellite along a great circle drawn about its circumference.

Vector 79, the magnetic intensity vector at the position of the satellite, is illustraed as emanating from the center thereof. This vector is representative of an infinite number of such vectors that may be determined in the approximate location of the satellite, one of which always will pass through the center of the vehicle. The velocity vector 80 is illustrated as representing the velocity of the vehicle at the same moment in time and, of course, also emanates from the center of the vehicle. Inasmuch as two vectors passing through a single point, 81, will always define a plane, the plane 76 is selected so that it contains both the magnetic intensity vector and the satellite velocity vector as illustrated in the figure. In general, some angle will separate the B vector 79 and the V vector 80, which angle is designated in the illustration as the angle $\gamma$. From magnetic theory it will be realized that the motion of the satellite through the magnetic field produces an induced potential that is a function of the position of the magnetic intensity vector and the velocity vector so that electron current is a maximum in the direction of the V x B vector. This is illustrated in FIG. 13 by the V x B vector 82 which is perpendicular to plane 76 and, in the illustration, extends upwards therefrom. The electron trap 78 which is positioned on the surface of satellite 75 and revolves about axis 77, will, once in each revolution, reach a position of nearest proximity to the V x B vector 82 and the electron current will maximize. Since the direction of the B vector at the satellite locality is a known quantity and the V vector is also known from the position of the satellite in its orbit, the V x B vector can always be determined. As the electron trap 78 revolves with the satellite a point will be reached at which the current maximizes. Another vector 83 is defined as emanating from the satellite center and passing through the electron trap 78 at this time, which vector diverges from the V x B vector by an angle $\delta$. These two vectors, just described, also pass through the point 81 and may be utilized to determine a second plane 84 perpendicular to the plane 76 which plane will contain the satellite axis since sensor 78 will be closest to the V x B vector when in the plane of the axis and that vector. Thus, by knowing the direction of the B and V vectors, the V x B vector is known, and by incorporating on the satellite surface additional sensors of either the ion type or the photo-emission type, depending on the appropriate conditions, information may be obtained to determine the angle between plane 84 and a new plane (not shown) containing the spin axis and either the velocity vector, if an ion type is utilized, or the solar vector, if a photo-emission type is used. This angle will be measured in a plane normal to the axis 77 of satellite rotation. Knowing this angle and the direction of the V x B vector, the plane containing the vector 83 and the satellite axis may be determined. Then by using the techniques previously explained these additional sensors are utilized to uniquely define one other vector in satellite coordinates which, when taken in conjunction with the location of plane 84, will enable a ground operator to uniquely determine the orientation of the satellite vehicle.

It should be noted that a plurality of electron traps could be just as conveniently utilized to uniquely determine the vector 83 and a single additional trap would serve to provide sufficient information to locate a plane, thus enabling the satellite's aspect angles to be determined. It should be realized that the formulas presented above for use with a photo-emission trap or an ion trap may be used with the electron trap. However, caution must be exercised as the output of the electron trap is believed to closely approximate a cosine function only for angles less than 45°.

It will be realized from the above that the inclusion of a plurality of any one of the types of traps described and a single trap of either of the two remaining types will provide sufficient information to uniquely determine the orientation of an object in space when the orbit and position in orbit of that body is known at any instant of time. Further by the proper selection of traps according to the principles enunciated it is possible to make the aspect determination independent of the visibility of the sun or other solar light source. By including all three types in various combinations it is possible, and often desirable, to provide increased flexibility and additional reliability of measurement.

Another application of the instant invention will be found in satellite guidance control mechanisms where the orientation determining traps may be used as a portion of a servo loop control system rather than to generate information for transmission to tracking stations. Thus a space vehicle may be maintained in a predetermined orientation by using the trap outputs as control signals to the satellite steering control mechanism where they may be compared with predetermined reference signals and then used to actuate suitable control means.

Although only a few embodiments of the instant invention have been described in detail it should be understood that various changes in the methods, details, materials, steps and arrangements of parts which have been herein described and illustrated in order to explain the nature of the invention may be made by those skilled in the art within the principle and scope of the invention as expressed in the appended claims.

I claim:

1. An orientation determining device for a rotating space vehicle having an outer surface and including a vehicle coordinate system, said vehicle being adapted for location at a known position in a known orbit in a region of diverse energy emission sources having vector directions, comprising in combination, a plurality of first particle traps disposed in spaced relationship on said surface of said vehicle in a plane including the axis of rotation of said vehicle, said first traps producing an output signal the magnitude of which is determined by the angle of incidence of energy from a first energy emission source relative to said first traps, a second particle trap disposed on said surface at a predetermined angular position from the plane containing said first traps, said second trap producing an output signal the magnitude of which is determined by the angle of incidence of energy from a second energy emission source relative to said second trap whereby said first traps will generate a combined output indicative of the angle of incidence of said first energy emission source on said surface and said second trap will generate a signal indicative of the location of a plane including said second energy emission source.

2. The device of claim 1 wherein said first traps are ion traps and said second trap is a photo-emission trap.

3. The device of claim 1 wherein said first traps are electron traps and said second trap is a photo-emission trap.

4. The device of claim 1 wherein said first traps are photo-emission traps and said second trap is an electron trap.

5. The device of claim 1 wherein said first traps are photo-emission traps and said second trap is an ion trap.

6. The device of claim 1 wherein said first traps are electron traps and said second trap is an ion trap.

7. The device of claim 1 wherein said first traps are ion traps and said second trap is an electron trap.

8. An orientation determination device for a rotating satellite having an outer surface at a known position in a known orbit, at least a portion of said orbit passing through a region containing a plurality of energy emission sources, said sources being representable by vectors having a known position in celestial space, comprising in combination plural output producing sensors positioned in spaced relationship relative to the surface of said satellite in a plane including the axis of rotation of said satellite, said sensors comprising an anode exposed to said energy emission sources, first voltage means carried by said satellite for maintaining said anode at a first potential difference relative to said satellite, a first grid interposed between said anode and said sources, second voltage means carried by said satellite for maintaining said first grid at a second potential difference relative to said satellite, a second grid interposed between said first grid and said sources, means carried by said satellite for maintaining said second grid at the potential of said satellite, the relative potentials of the anode and first grid of one of said sensors being maintained at levels suitable for the detection of a first energy emission source in the region of said satellite and the relative potentials of the anode and first grid of the remaining sensors being maintained at levels suitable for the detection of a second energy emission source in the region of said satellite whereby the output produced by said one sensor will determine the position of a plane relative to said satellite containing said vector representing said first energy emission source and the output produced by said remaining sensors will determine the angle of incidence of the vector representing said second energy emission source.

9. The device of claim 8 wherein both said first potential difference and said second potential difference on said one of said sensors are maintained at a negative potential relative to said satellite, with said second potential difference maintained relatively more negative than said first potential difference, and said first potential difference and said second potential difference on said remaining sensors are maintained at a positive potential relative to said satellite, with said first potential difference maintained relatively more positive than said second potential difference, whereby said one of said sensors is an ion trap and said remaining sensors are electron traps.

10. The device of claim 8 wherein both said first potential difference and said second potential difference on said one of said sensors are maintained at a positive potential relative to said satellite, with said first potential difference maintained relatively more positive than said second potential difference, and said first potential and said second potential difference on said remaining sensors are maintained at a negative potential relative to said satellite, with said second potential difference maintained relatively more negative than said first potential difference, whereby said one of said sensors is an electron trap and said remaining sensors are ion traps.

11. The device of claim 8 wherein both said first potential difference and said second potential difference on said one of said sensors are maintained at a positive potential relative to said satellite, with said first potential difference maintained relatively more positive than said second potential difference, said first potential difference on said remaining sensors is maintained at a negative potential difference relative to said satellite, and said second potential on said remaining sensors is maintained at a positive potential difference relative to said satellite, whereby said one of said sensors is an electron trap and said remaining sensors are photo-emission traps.

12. The device of claim 8 wherein both said first potential difference and said second potential difference on said one of said sensors are maintained at a negative potential relative to said satellite, with said second potential difference maintained relatively more negative than said first potential difference, said first potential difference on said remaining sensors is maintained at a negative potential relative to said satellite, and said second potential difference on said remaining sensors is maintained at a positive potential difference relative to said satellite, whereby said one of said sensors is an ion trap and said remaining sensors are photo-emission traps.

13. The device of claim 8 wherein said first potential difference on said one of said sensors is maintained at a negative potential difference relative to said satellite, said second potential difference on said one of said sensors is maintained at a positive potential difference relative to said satellite, and said first potential difference and said second potential on said remaining sensors are maintained at a negative potential relative to said satellite, with said second potential difference maintained relatively more negative than said first potential difference, whereby said one of said sensors is a photo-emission trap and said remaining sensors are ion traps.

14. The device of claim 8 wherein said first potential difference on said one of said sensors is maintained at a negative potential difference relative to said satellite, said second potential difference on said one of said sensors is maintained at a positive potential difference relative to said satellite, and said first potential difference and said second potential difference on said remaining sensors are maintained at a positive potential relative to said satellite, with said first potential difference maintained relatively more positive than said second potential difference, whereby said one of said sensors is a photo-emission trap and said remaining sensors are electron traps.

15. The method of determining the orientation of a space vehicle having a coordinate system at a known location in a known orbit, comprising the steps of locating in the coordinates of said vehicle a first vector representative of the direction of a first energy emission source relative to said vehicle, the direction of said first vector in spatial coordinates being known, locating in the coordinates of said vehicle a plane containing a second vector representative of the direction of a second energy emission source relative to said vehicle, the direction of said second vector spatial coordinates being known, and utilizing the intersection of said first vector and said plane to determine the orientation of said vehicle in spatial coordinates.

16. The method of determining the orientation of a rotating space vehicle having a coordinate system at a known location in a known orbit, comprising the steps of measuring the intensity of incident energy resultant from a known first energy emission source at a plurality of selected points on the surface of said vehicle, obtaining from said measurements the vector direction in vehicle coordinates of said first energy emission source, measuring the intensity of incident energy resultant from a known second energy emission source at an additional single point on the surface of said vehicle, locating from said measurement a plane including the vector direction in vehicle coordinates of said second energy emission source, and utilizing the intersection of the vector direction of said first energy emission source and the plane including the vector direction of said second energy emission source to determine the orientation of said vehicle in spatial coordinates.

17. The method of determining the orientation of a rotating space vehicle having an outer surface and a vehicle coordinate system, said vehicle being located at a known position in a known orbit in a region of charged particles, comprising the steps of exposing a plurality of first energy sensors located at prederetermined positions on the surface of said vehicle to a first energy emission source said first energy emission source being representable by a first vector having known spatial coordinates, said first energy emission source controlling relative motion between said first energy sensors and some of the said charged particles present at the location of said vehicle according to a known relationship, said first energy sensors operable to produce an output signal determined by the angle of incidence of said first vector, exposing a second energy sensor located on the surface of said vehicle in spaced relationship to said first energy sensors to a second energy emission source being representable by a second vector with known spatial coordinates, said energy source controlling relative motion between said second energy sensor and some of said charged particles present at the location of said vehicle according to a known relationship, said second energy sensor operable to produce an output signal indicative of the angle of incidence of said second vector, utilizing the output signals of the two of said first energy sensors having the greatest maximum output and said second energy sensor output to determine in the coordinates of said vehicle the direction of said first vector and the location of a plane containing said second vector, and utilizing the intersection of said first vector and said plane to determine the orientation of said vehicle in spatial coordinates.

18. The method of determining the orientation of a space vehicle rotating about an axis, said vehicle being located at a known position in a known orbit, comprising the steps of measuring the spin rate of said vehicle by exposing a first energy sensor at a known position on said vehicle to a first energy emission source having a known orientation vector in space, said first energy sensor providing a first signal indicative of the spin rate of said vehicle, obtaining from said first signal the angular orientation of a plane coincident with the spin axis of said vehicle to establish the orientation vector of said first energy emission source relative to said known position on said vehicle, measuring the angle of incidence relative to said vehicle of a second energy emission source having a known orientation vector in space by exposing a plurality of second energy sensors to said second energy emission source, obtaining from said orientation angle a second vector indicating the orientation of a further known point on said vehicle relative to said second energy emission source, and obtaining from the intersection of said plane and said second vector the orientation of said vehicle in spatial coordinates.

References Cited by the Examiner
UNITED STATES PATENTS 3,030,049  4/62  Pilkington ______________ 343—5

OTHER REFERENCES

Explorer Finds New Way to Orient by Gettings, Missiles and Rockets, vol. 8, No. 25, June 19, 1961, pages 16 and 17.

Guidance for Space Craft, by Scull, Navigation, vol. 8, No. 1, Spring 1961, pages 24–33.

Stabilization Attitude Control of Satellite Vehicles, by Frye et al., American Rocket Society Journal, December 1959, pp. 927 to 931.

Sun Sensor Orients Space Craft, Electronics, Mar. 4, 1960, pages 62 and 64.

RALPH G. NILSON, *Primary Examiner.*

ARTHUR GAUSS, JAMES W. LAWRENCE, *Examiners.*